Sept. 30, 1941. W. R. KING 2,257,171
LOW PRESSURE BOOSTER REGULATOR
Filed Jan. 13, 1938
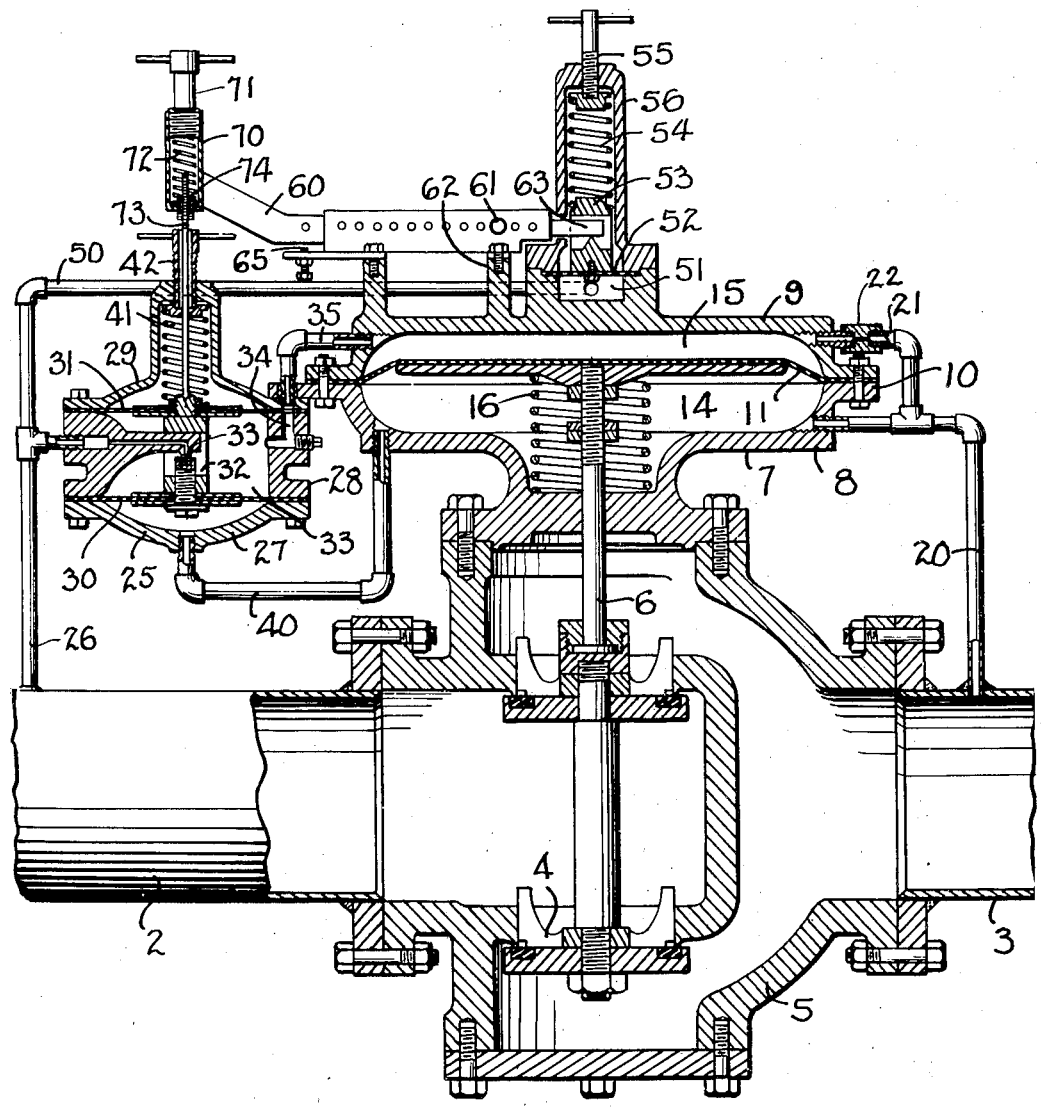
Inventor
WILLIAM R KING.
Jesse R. Stone
Lester B. Clark
By
Attorneys Patented Sept. 30, 1941

2,257,171

UNITED STATES PATENT OFFICE 2,257,171

LOW PRESSURE BOOSTER REGULATOR

William R. King, Mineola, Tex.

Application January 13, 1938, Serial No. 184,782

8 Claims. (Cl. 50—11)

The invention relates to a regulator for the control of fluid through pipelines and is particularly adapted for use where the high pressure determines the operating pressure at which the regulator will admit fluid to the low pressure side of the regulator.

The invention relates generally to the subject matter disclosed in my co-pending applications, Serial No. 89,004, filed July 6, 1936, for a Regulator valve which has matured into Patent No. 2,182,873 dated December 12, 1939, and Serial No. 146,558, filed June 5, 1937, for a Differential pressure loaded control valve. The present invention is directed to the control of the valve by power from the high pressure side.

Another object of the invention is to provide a regulator wherein the pressure at which it will deliver gas to the low pressure side will be controlled by the high pressure applied thereto.

Another object of the invention is to provide a regulator whose pressure at which it will deliver gas will vary with the inlet pressure within predetermined limits of the variation of the high pressure applied thereto.

Still another object of the invention is to utilize the variation in pressure on the high pressure side to reset the pilot valve in a regulator system.

Another object of the invention is to provide power for operating the regulator from the high pressure side and to control this power by variation in the high pressure.

Another object of the invention is to provide a regulator device wherein the regulator valve may be loaded by the high pressure to vary the low pressure in accordance with such loading.

Other and further objects of the invention will be readily apparent when the following description is considered in connection with the accompanying drawing, wherein:

The figure shows a vertical sectional view of the parts with the valve in closed position.

A pipeline 2 contains fluid under a high pressure and the flow of such fluid to a low pressure pipe 3 is controlled by a main valve 4. This valve is disposed within the housing 5 and is arranged to be actuated by a stem 6. This stem extends upwardly into a diaphragm housing 7 which is formed by the base 8 and the cap plate 9. These two parts are held together by the bolts 10 and confine a diaphragm 11 which is arranged to separate this housing into the lower chamber 14 and an upper chamber 15.

A spring 16 is disposed about the stem 6 and is arranged to normally urge the stem upwardly and the valve to closed position and to also exert a pressure tending to discharge fluid from the upper chamber 15.

In order that a variation in the low pressure in the pipe 3 will be available in the chamber 14 a pipe 20 is connected to the chamber 14 and a branch 21 of this pipe extends to the chamber 15. A choke 22 in the pipe delays the exhaust of fluid from the chamber 15 into the low pressure pipe 3.

A reducer or pilot regulator valve 25 is positioned adjacent the main valve and receives its pressure from a pipe 26 connected to the high pressure side of the valve 4. This reducer valve is made up of a base plate 27, a housing ring 28, and a cap 29. It will be observed that the diaphragm 30 is positioned between the parts 27 and 28 and that a similar diaphragm 31 is positioned between the parts 28 and 29. The valve member 32 is carried by these diaphragms 30 and 31 and will move in accordance with the movement of such diaphragms. This valve member 32 closes the bore 33 which leads into the ring 28 so that when the diaphragms are moved upwardly the entrance of fluid will be prevented but when the diaphragms move down, the valve will be open.

The pressure admitted to the chamber 33 in the pilot valve may escape through the passage 34 and the pipe 35 into the chamber 15 above the diaphragm 11 and an increase in this pressure will be exerted on the diaphragm 11 tending to open the valve. In order that the diaphragms 30 and 31 may be forced to move as a function of the variation in the low pressure the by-pass pipe 40 is connected from the chamber 14 into the base 27 to vary the pressure on the lower side of the diaphragm 30.

A spring 41 is disposed in the cap 29 and normally urges the diaphragms 30 and 31 downwardly to open the valve 33 for the entrance of pressure fluid. An adjustable screw 42 is used to set the spring 41.

In view of the exposed area of the diaphragms 30 and 31, it is of course necessary to apply power to the valve 32 to accomplish its opening and for this purpose a pipe 50 is connected as an extension to the high pressure pipe 26 and leads into a chamber 51 in the top 8 of the diaphragm housing 7. This chamber 51 is closed by a diaphragm 52 so that the high pressure entering this chamber will tend to move the diaphragm upwardly. The diaphragm is firmly held down by a head 53 against which the spring 54 is arranged to abut. This spring is adjustable by the set screw 55 carried by the cylinder 56 in which these parts are disposed so that the diaphragm and head will start to move only when the pressure in 51 exceeds the setting.

In order to take advantage of the power thus obtained, a lever 60 is pivoted on the crossbar 61 carried by an upright 62 on the cap 9. This lever has a finger 63 extending into the head 53 so that movement of the diaphragm 51 will cause rocking of the lever 60. An adjustable stop 65 is arranged to limit the amount of rocking of the lever so that an excessive amount of movement is prevented but the adjustment will be such that the valve 32 will open when the lever tilts.

A sleeve 70 is carried by the left hand end of this lever 60 and an adjustable screw 71 therein is arranged to set a spring 72 by which the movement of the sleeve 70 is conveyed to the stem 73. This stem has an adjustable nut 74 thereon so that the position of the sleeve 70 can be adjusted with respect to the stem. This stem 73 extends into the reducer valve cap 29 and engages the top of the valve 32 where it is connected to the diaphragm 31.

The provision of the springs 54 and 72 are for the purpose of providing the predetermined minimum and maximum limits of pressure which will cause the operation of the stem 73 in causing movement of the valve 32.

With the parts as just described, it seems obvious that a very fine adjustment of the operation of the valve 32 can be obtained so as to apply a desired pressure tending to open and close the valve 32.

In view of the fact that the valve 32 has a predetermined pressure applied to it, tending to open it, its operation thereafter will be almost wholly dependent upon the variation of the low pressure applied to the under side of the diaphragm 30 from the chamber 14 and, of course, from the low pressure pipe 3.

Under operation when the low pressure in the pipe 3 is reduced, there will be a consequent reduction of pressure in the chamber 14 and against the diaphragm 30. This will permit opening of the valve 32 and the entrance of the pressure fluid into the chamber 33. This increase of pressure in the chamber 33 will be transmitted, of course, to the chamber 15.

The tendency of the main valve 4 will thus be to open because the pressure has been increased in the chamber 15. The valve 4 now opens.

The opening of the valve 4 increases the pressure in the low pressure pipe 3 so that there will be a building up of the pressure in the chamber 14. There will also be a build up in the pressure under the diaphragm 30 and the regulator 32 will thus move to closed position. This will cut off any further increase in pressure in the chamber 15, but the valve is still open and the diaphragm 11 is held down by the pressure in the chamber 15 which of course exceeds the pressure in the chamber 14 as well as the force of the spring 16. The choke 22 allows this excess pressure to gradually leak out of the chamber 15 and eventually the diaphragm 11 moves up and the valve 4 closes. This choke permits the building up of a pressure in the chamber 15 to hold the valve open if desired.

Of course any variation in the high pressure side within predetermined limits will cause resetting of the loading mechanism to admit fluid through the main valve at a higher pressure.

The present combination has its application in a pipeline system where a plurality of branch lines are all interconnected and where each branch is to be controlled by a valve arrangement herein described. The feeder line to which all of these branches are connected will be controlled by a regulator of the type disclosed in my second co-pending application, which in the operation is governed by the velocity of flow and volume of fluid used. Such valve regulation, however, is not desirable on branch lines which are interconnected because the flow for all of the lines might pass through one of the valves and cause that one to stay open while all the others might regain closed.

With the present device, however, the regulation is obtained by varying the high pressure and all of the branch line regulators would therefore operate substantially in unison upon an increase or decrease in the high pressure feeder line to which they were all connected.

The springs 54 and the pin 61 can be adjusted so as to determine the pressure at which the boosting will start and the ratio at which the boosting force increases the operating pressure of the pilot regulator.

It seems obvious that the relative position in the line of each particular regulator may have a bearing upon its particular adjustment.

It should be borne in mind that the conditions for each regulator may be entirely different, thus if a regulator is closed to the main valve the operating pressure applied in its upstream side might be higher than some other regulator positioned further along the feeder line. The difference in the high pressures of two such regulators would of course be due to the losses in the line. In other instances the same pressure might be applied to several regulators on the high pressure side but on the other hand it might be desirable to maintain lower and different pressures on the down stream side of each regulator. Even though two branch lines were inter-connected and the flow thereto controlled from the feeder line by two separate regulator valves, it might be desirable to have a different down stream pressure at each regulator valve due to losses in the branch line, due to the proximity of a large load thereto or for various other reasons.

The adjustment of the spring 54 controls the pressure at which the booster assembly will begin to operate. Thus the spring 54 may be set to begin to operate only when the pressure in the line 2 and the pipe 26 is, say 10 pounds for one of the regulators in the system, where some other regulator further along the feeder line may have its spring 54 set so that it will begin to operate at a pressure of only 3 pounds.

Thus if these two pressures are maintained on these two regulators, then the spring 41 will of course open and close the valve 32 when a variation in the downstream pressure occurs, due to the change in pressure on the lower surface of the diaphragm 30. If, however, the feeder is now subjected to a higher pressure so that the valve which previously had 10 pounds on the high pressure side, now has say 20 pounds applied to it and the valve which previously had 3 pounds has an operating pressure now of only 5 pounds. Then of course both booster mechanisms will be caused to operate, tending to open the valve 32 in each regulator. If the downstream pressure in each of these two valves is to be boosted the same amount upon an increase on the high pressure side, then of course the pin 61 in each of them may be positioned in accordance with the original downstream pressure desired but if, on the other hand, the ratio at which the boosting force serves to increase the operating pressure applied to the pilot regulator is to be altered so that the downstream pressure will be increased at some proportion other than the original proportion to the increase in the high pressure, then of course the pin 61 in that particular regulator which is to have a different ratio will have to be positioned at a different location in order to obtain this change in ratio. In other words, the regulators will be set and adjusted for the particular set of circumstances in which they are to operate, depending upon the various factors such as the applied pressure, the proportion of increase, the line drop, the proximity and size of the load and the demand which is to be required in each particular location.

The regulator is arranged to operate within predetermined limits because if the pressure in the line 2 drops below the setting of the spring 54, the head 55 merely drops away from the finger 63 and of course that regulator will operate at the pressure set by spring 41. The setting of the spring 54 therefore determines the minimum pressure at which the pressure in pipe 2 will start boosting the operating pressure of the regulator. On the other hand the spring 72 can be adjusted to limit the pressure which will be applied to the stem 73 in order to open the valve 32 and if a greater pressure than this is applied then of course the spring 72 will be compressed and the same effect will be obtained as though only the maximum pressure for which the device was set was being applied. Thus if the back pressure on the diaphragm 30 is sufficiently great, valve 32 may close irrespective of the high pressure in the line 2 because the spring 72 may compress under these circumstances without imparting any movement to the lever 60 which would of course be held immovable due to the excessive pressure in the chamber 51. Thus the valve might not be held open even though there was an excessive high pressure in the line 2. Thus the increase in the high pressure will cause operation of the regulator but only to a predetermined extent and any hunting action tending to build up the pressure in the low pressure line beyond the predetermined setting will be eliminated by the provision of the adjustments just described.

Broadly the invention contemplates a regulator device which will be operated as a function of the variation in the high pressure and wherein the power for actuating the mechanism is derived from the high pressure.

What is claimed is:

1. A booster regulator valve assembly including a valve, a diaphragm to actuate said valve, means to conduct the pressure from the low pressure side of said valve to the low pressure side of said diaphragm, a regulator, means to connect said regulator to the high pressure side of said valve, means connecting said regulator to the high pressure side of said diaphragm, means connecting the low pressure side of said valve to oppose the opening of said reducer and means to load said reducer including a piping connection to utilize the power of the fluid from the high pressure side.

2. The combination of a main valve, a diaphragm to actuate said valve, a reducer for the high pressure to said diaphragm, a diaphragm to actuate said reducer, a loading device for said reducer, and a diaphragm operable by the high pressure on said main valve to actuate said loading device.

3. The combination of a main valve, a diaphragm to actuate said valve, a reducer, a diaphragm to actuate said reducer, a loading device for said reducer, a diaphragm operable by the high pressure on said main valve to actuate said loading device, and means to conduct the pressure of the downstream side of said valve to two of said diaphragms.

4. The combination of a main valve, a diaphragm to actuate said valve, a reducer, a diaphragm to actuate said reducer, a loading device for said reducer, a diaphragm operable by the high pressure on said main valve to actuate said loading device, and means to conduct the pressure of the upstream side of said valve to said last diaphragm.

5. In a regulator valve, a reducer, a loading device for said reducer, said loading device comprising a lever, resilient members at each end thereof, a diaphragm to actuate one of said resilient members, and a connection from the high pressure side of said valve to said diaphragm.

6. A control valve for fluid pressure lines, a diaphragm to actuate said valve, means to apply the low pressure beyond said valve to close said valve, and means to control the downstream pressure, said means being operable within predetermined limits due to the variation of the pressure from the high pressure side of said valve to open said valve.

7. A control valve for fluid pressure lines, a diaphragm to actuate said valve, means to apply the low pressure beyond said valve to close said valve, and means to control the downstream pressure, said means being operable within predetermined limits due to the variation of pressure from the high pressure side of said valve to open said valve, said means being adjustable to start functioning upon an increase in the high pressure beyond a predetermined value.

8. A control valve for fluid pressure lines, a diaphragm to actuate said valve, means to apply the low pressure beyond said valve to close said valve, means to control the downstream pressure, said means being operable within predetermined limits due to the variation of pressure from the high pressure side of said valve to open said valve, and additional means to adjust the ratio of application of the force of said latter means.

WILLIAM R. KING.